US012673770B2

(12) United States Patent
O'Leary et al.

(10) Patent No.: US 12,673,770 B2
(45) Date of Patent: Jul. 7, 2026

(54) BLENDED WING BODY TANKER AND METHOD OF USE

(71) Applicant: JetZero, Inc., Long Beach, CA (US)

(72) Inventors: Thomas James O'Leary, Orange, CA (US); Mark Allan Page, Orange, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 17/672,829

(22) Filed: Feb. 16, 2022

(65) Prior Publication Data

US 2023/0257134 A1 Aug. 17, 2023

(51) Int. Cl.
| | |
|---|---|
| *B64C 39/10* | (2006.01) |
| *B64D 37/06* | (2006.01) |
| *B64D 37/30* | (2006.01) |
| *B64D 39/00* | (2006.01) |

(52) U.S. Cl.
CPC .............. *B64C 39/10* (2013.01); *B64D 37/06* (2013.01); *B64D 37/30* (2013.01); *B64D 39/00* (2013.01); *B64C 2039/105* (2013.01)

(58) Field of Classification Search
CPC ........ B64D 37/30; B64D 37/06; B64D 39/00; B64D 37/04; B64C 2039/105
See application file for complete search history.

(56) References Cited

U.S. PATENT DOCUMENTS

| | | | | | |
|---|---|---|---|---|---|
| 3,108,769 | A | * | 10/1963 | Hieber | B64D 39/00 |
| | | | | | 244/135 A |
| 6,923,403 | B1 | * | 8/2005 | Dizdarevic | B64C 39/10 |
| | | | | | 244/36 |
| 7,093,798 | B2 | * | 8/2006 | Whelan | B64C 1/10 |
| | | | | | 244/120 |
| 7,665,479 | B2 | | 2/2010 | Cutler et al. | |
| 7,793,884 | B2 | * | 9/2010 | Dizdarevic | B64C 30/00 |
| | | | | | 244/36 |
| 7,871,042 | B2 | * | 1/2011 | Velicki | B64D 37/06 |
| | | | | | 244/135 R |
| 8,366,050 | B2 | | 2/2013 | Odle et al. | |

(Continued)

FOREIGN PATENT DOCUMENTS

| | | | | |
|---|---|---|---|---|
| CN | 103213683 | A | 7/2013 | |
| EP | 2687444 | A1 * | 1/2014 | B64D 39/00 |

(Continued)

OTHER PUBLICATIONS

Jay Bennett, Here's the Wing-Body Tanker That Could Refuel the F-35, Dec. 24, 2016.

(Continued)

*Primary Examiner* — Philip J Bonzell

(74) *Attorney, Agent, or Firm* — Jeffrey Schox

(57) ABSTRACT

Aspects relate to blended wing body tankers and methods of use. An exemplary blended wing body tanker includes a blended wing body, a first fuel store located within the blended wing body and configured to store a first fuel, a fuel offloading system operatively connected to the first fuel store and configured to offload the first fuel to another aircraft in flight, a second fuel store located within the blended wing body and configured to store a second fuel different from the first fuel, and a propulsion system powered by the second fuel and configured to propel the blended wing body.

30 Claims, 7 Drawing Sheets

(56) References Cited

U.S. PATENT DOCUMENTS

| | | | | |
|---|---|---|---|---|
| 8,459,593 | B2 | 6/2013 | Richardson | |
| 9,227,735 | B2 | 1/2016 | Kusnitz | |
| 9,260,206 | B2 | 2/2016 | Allen et al. | |
| 9,409,651 | B2* | 8/2016 | Tichborne | F04D 29/22 |
| 9,487,166 | B2* | 11/2016 | Loison | H02J 3/381 |
| 9,676,491 | B2 | 6/2017 | Epstein et al. | |
| 9,845,160 | B2* | 12/2017 | Tichborne | B64D 39/00 |
| 11,247,776 | B2* | 2/2022 | Princen | B64C 39/10 |
| 2005/0178912 | A1* | 8/2005 | Whelan | B64C 1/10 |
| | | | | 244/120 |
| 2006/0237583 | A1* | 10/2006 | Fucke | B64D 13/06 |
| | | | | 244/58 |
| 2008/0230654 | A1* | 9/2008 | Velicki | B64D 37/04 |
| | | | | 244/135 R |
| 2012/0273619 | A1* | 11/2012 | Tichborne | B64C 17/10 |
| | | | | 244/135 A |
| 2013/0285443 | A1* | 10/2013 | Loison | H02J 3/381 |
| | | | | 307/9.1 |
| 2015/0022376 | A1* | 1/2015 | Zhang | G01F 23/26 |
| | | | | 340/870.37 |
| 2015/0300260 | A1* | 10/2015 | Wollenweber | F02C 9/40 |
| | | | | 60/39.12 |
| 2015/0321767 | A1* | 11/2015 | Kamath | F02C 3/22 |
| | | | | 244/135 C |
| 2016/0025339 | A1* | 1/2016 | Kamath | F02C 3/22 |
| | | | | 60/39.12 |
| 2016/0355274 | A1* | 12/2016 | Tichborne | B64C 17/10 |
| 2020/0307789 | A1* | 10/2020 | Princen | B64C 39/10 |
| 2021/0197981 | A1* | 7/2021 | Pitman | B64D 39/06 |
| 2021/0339858 | A1* | 11/2021 | Ermanoski | B64C 29/0025 |
| 2021/0362871 | A1* | 11/2021 | Pitman | B64D 39/06 |

FOREIGN PATENT DOCUMENTS

| | | | | | |
|---|---|---|---|---|---|
| WO | WO-0224529 | A1 * | 3/2002 | | B64D 1/18 |
| WO | WO-2006073468 | A2 * | 7/2006 | | B64D 39/00 |
| WO | WO-2010059155 | A1 * | 5/2010 | | B64D 39/00 |
| WO | WO-2010065036 | A1 * | 6/2010 | | B64D 39/00 |
| WO | WO-2010071643 | A1 * | 6/2010 | | B64D 39/00 |
| WO | WO-2011093886 | A1 * | 8/2011 | | B64D 39/00 |

OTHER PUBLICATIONS

Feijia Yin; Arvind G. Rao; Jos P. Van Buijtenen, Performance Cycle Analysis for a Multi-Fuel Hybrid Engine, Jun. 30, 2013.
Zdobyslaw Goraj, Design and Optimisation of Fuel Tanks for Bwb Configurations, Dec. 31, 2016.

* cited by examiner

500

505 — Storing a first fuel

510 — Offloading first fuel

515 — Storing second fuel

520 — Propelling blended wing body

BLENDED WING BODY TANKER AND METHOD OF USE

FIELD OF THE INVENTION

The present invention generally relates to the field of aviation. In particular, the present invention is directed to blended wing body tanker and method of use.

BACKGROUND

Tankers are used to refuel aircraft in flight. Performance of tankers may be considered according to their service radius and fuel offload.

SUMMARY OF THE DISCLOSURE

In an aspect, an exemplary blended wing body tanker includes a blended wing body, a first fuel store located within the blended wing body and configured to store a first fuel, a fuel offloading system operatively connected to the first fuel store and configured to offload the first fuel to another aircraft in flight, a second fuel store located within the blended wing body and configured to store a second fuel different from the first fuel, and a propulsion system powered by the second fuel and configured to propel the blended wing body. For instance in some embodiments, blended wing body tanker may be propelled using hydrogen fuel and deliver kerosene.

In another aspect, an exemplary method of use for blended wing body tanker includes storing, using a first fuel store located within a blended wing body, a first fuel, offloading, using a fuel offloading system operatively connected to the first fuel store, the first fuel to another aircraft in flight, storing, using a second fuel store located within the blended wing body, a second fuel different from the first fuel, and propelling, using a propulsion system powered by the second fuel, the blended wing body.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to blended wing body tankers and methods of use. In an embodiment, a blended wing body tanker is a tanker having a blended wing body. As used in this disclosure, a "tanker" is an aircraft configured to store, transport, and/or offload fuel. In some cases, a tanker may be used to offload fuel to another aircraft, for example in flight, thereby increasing flight time and/or range of the other aircraft.

Aspects of the present disclosure can be used to improve range of refueling or refueled aircraft. For instance, in some cases, aerodynamic benefits of blended wing body may increase a functional radius of tanker. Aspects of the present disclosure can also be used to power tanker with a non-kerosene-based fuel, such as liquid hydrogen and/or liquid natural gas. This is so, at least in part, because blended wing body aircraft may have an increased volume, suitable for additional volume required by liquid hydrogen and liquid natural gas. Liquid hydrogen while have a low energy density by volume has a high energy density by mass, thus allowing a weight-limited tanker operating on liquid hydrogen to provide a greater weight capacity for offloading fuel.

Additional aspects of the present disclosure can be used to further improve range of refueling or refueled aircraft by providing a hybrid propulsion system that may operate using more than one type of fuel. For example, in some cases, a blended wing body tanker may be powered by liquid hydrogen and also a kerosene-based fuel. In some cases, tanker may be tanking kerosene-based fuel. Therefore a hybrid blended wing body tanker that may operate on multiple types of fuel may additionally benefit from an increased range by consuming a refueling tanked fuel (e.g., kerosene-based fuel) once a primary fuel (e.g., liquid hydrogen) has been consumed.

Aspects of the present disclosure allow for increased fuel payloads and increased tanker range. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 4. Furthermore, there is no intention to be bound by any expressed or implied theory presented in this disclosure.

Figure 1:
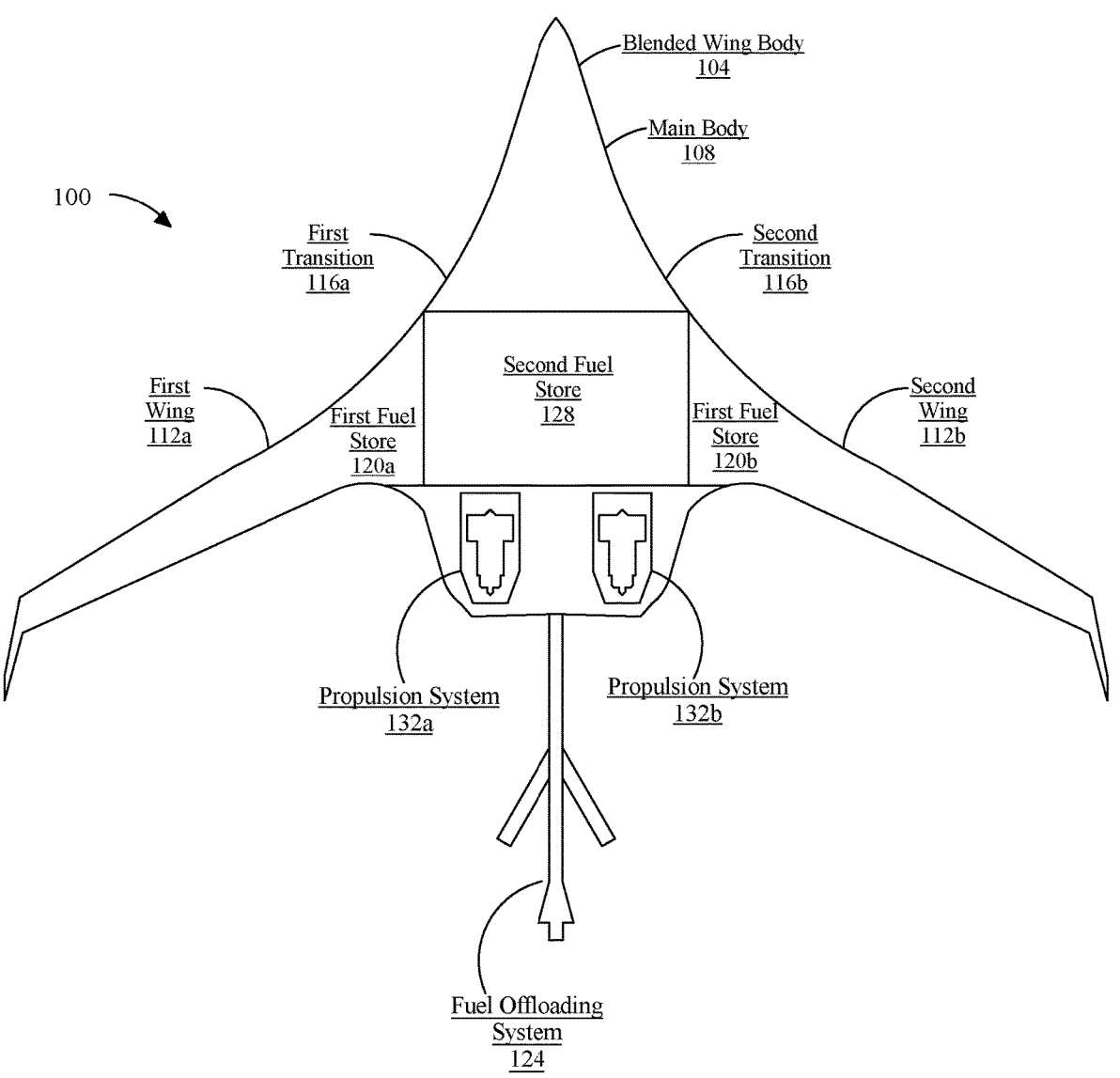
FIG. 1 is a top-down view of an exemplary blended wing body tanker.

Referring now to FIG. 1, an exemplary blended wing body tanker 100 is illustrated in a top-down view. As referred to in this disclosure, a "blended wing body aircraft" is an aircraft having a blended wing body. Blended wing body aircraft 100 may include any blended wing body aircraft described in this disclosure, including with reference to FIGS. 2A-4 below. Tanker 100 includes a blended wing body 104. As used in this disclosure, A "blended wing body" (BWB), also known as a "blended body" or a "hybrid wing body" (HWB), is a fixed-wing aircraft body having no striking demarcation between wings and a main body of the aircraft along a leading edge of the aircraft. Blended wing body 104 may include any blended wing body described in this disclosure, including with reference to FIGS. 2A-4 below.

With continued reference to FIG. 1, tanker 100 and/or blended wing body 104 include a main body 108. Main body 108 may be centrally located laterally within aircraft 100, for example substantially between two wings. As used in this disclosure, a "main body" or "centerbody" is a centrally located portion of aircraft. In some cases, main body, unlike wings and/or transitions, has an associated lift coefficient with a minimal value. In some embodiments, aircraft 100 may have a lift distribution across a span that is approximately elliptical. In some cases, lift distribution may be understood of as a two-dimensional distribution where an X-axis represents span station laterally across aircraft, from tip to tip and a Y-axis represents total lift per unit span (for example, in pounds per inch of span). In some cases, total lift per unit span may be a function of a product of a local wing chord and a local wing lift coefficient. As main body will typically have a long local chord length, in some cases, a designer will minimize local lift coefficient at the main body to ensure an elliptical lift distribution. Lift coefficient of main body may be minimized by adjusting main body incidence (relative to the transitions and outboard wings) and by adjusting the main body's camber (to a low value, typically). Main body may include any main body described in this disclosure, include with reference to FIGS. 2A-4 below.

With continued reference to FIG. 1, tanker 100 and/or blended wing body 104 may include two wings 112*a-b*. As used in this disclosure, "wings" are components of an aircraft configured to generate lift as a function of dynamic pressure and angle of attack. Each wing may be distally located laterally on tanker 100, for example that a most distal part of each wing 112*a-b* represents a most distal part of the tanker 100. Wings 112*a-b* may include any wing described in this disclosure, for example with reference to FIGS. 2A-4 below.

With continued reference to FIG. 1, tanker 100 and/or blended wing body 104 may include two transitions 116*a-b*. As used in this disclosure, a "transition" of a blended wing body is a portion of a blended wing body between wing and main body. Transitions 116*a-b* may include any transition described in this disclosure, for example with reference to FIGS. 2A-4 below. Each transition 116*a-b* may be located between main body 108 and a wing 112*a-b*.

With continued reference to FIG. 1, in some cases, tanker 100 may include a first fuel store 120*a-b* within blended wing body 104. As used in this disclosure, a "fuel store" is a container for fuel, such as without limitation a tank, a bladder, a reservoir, and the like. First fuel store 120*a-b* may be located anywhere within blended wing body 104. For example, first fuel store 120*a-b* may be located in one or more of main body 108, a wing 112*a-b*, and/or a transition 116*a-b*. As shown in FIG. 1, first fuel store may be located within each transition 116*a-b* and wing 112*a-b* of blended wing body 108. In some embodiments, first fuel may include one or more of a kerosene-based fuel and a gasoline-based fuel. First fuel store and first fuel may include any fuel store or fuel described in this disclosure, for example with reference to FIG. 4.

With continued reference to FIG. 1, tanker 100 may include a fuel offloading system 124. As used in this disclosure, a "fuel offloading system" is a system configured to offload fuel from a tanker. In some cases, a fuel offloading system 124 may be configured to offload during flight. In some cases, a fuel offloading system may be configured to offload into another aircraft, thereby refueling the other aircraft. Fuel offloading system 124 may be operatively connected to first fuel store 120 and configured to offload first fuel to a receiving aircraft in flight. Fuel offloading system 120 may include a boom and/or a probe—and drogue to connect with receiving aircraft. Fuel offloading system 120 may include any fuel offloading system described in this disclosure, for example with reference to FIGS. 2A-B below.

With continued reference to FIG. 1, tanker 100 may include a second fuel store 128. Second fuel store 128 may be located anywhere within blended wing body 104. For example, second fuel store 128 may be located in one or more of main body 108, a wing 112*a-b*, and/or a transition 116*a-b*. As shown in FIG. 1, second fuel store may be located within main body 104 of blended wing body 108. In some cases, second fuel store 128 may be configured to store a second fuel different from first fuel. For example, in some cases, second fuel may include one or more of liquid hydrogen fuel and liquid natural gas fuel, while first fuel includes one or more of a kerosene-based fuel and a gasoline-based fuel. Second fuel store and second fuel may include any fuel store or fuel described in this disclosure, for example with reference to FIG. 2A-4.

Still referring to FIG. 1, in some embodiments, second fuel store 128 may additionally include an insulated wall. As used in this disclosure in a thermal context, an "insulated wall" is any structure configured to restrict, slow, minimize, or otherwise limit a flow of heat. In some cases an insulated wall may include a hermetically sealed portion, through which heat transfer by convection is limited. For example, in some cases an insulated wall may include a hermetically sealed portion containing one or more of a vacuum and gas having a low heat transfer properties (e.g., argon, krypton, and the like). As used in this disclosure, a "vacuum" is a pressure below that of the cabin pressure. Alternatively or additionally, in some cases, insulated wall may include insulation. As used in this disclosure in a thermal context, "insulation" is any material that restricts, slows, minimizes, or otherwise limits a flow of heat. In some cases, insulated wall of second fuel store 128 may be configured to limit heat transfer to second fuel. Insulated wall and insulation may include any thermal insulation means described in this disclosure, for example with reference to FIGS. 3-4.

With continued reference to FIG. 1, tanker 100 may include a propulsion system 132*a-b*. As used in this disclosure, a "propulsion system" is any system or device configured to generate thrust in a fluid medium. For example, a propulsion system 132*a-b* may include a propulsor (e.g., fan, propeller, rotor, and the like). In some cases, a propulsion system 132*a-b* may include one or more of an engine (e.g., jet engine) and a motor (e.g., electric motor). Propulsion system 132*a-b* may include any propulsion system, propulsor, engine, or motor described in this disclosure, for example with reference to FIGS. 2A-4.

Still referring to FIG. 1, in some embodiments, propulsion system 132*a-b* may include an engine fueled by one or more of first fuel and second fuel. Engine may include any engine described in this disclosure for example with reference to FIG. 4. Alternatively or additionally, in some embodiments, propulsion system 132*a-b* may include a motor powered by electricity. Motor may include any motor described in this disclosure for example with reference to FIGS. 2A-4. In some cases. electricity may be derived from one or more of first fuel and second fuel. For example, in some cases, electricity may be generated from one or more of a generator, alternator or the like. Alternatively or additionally, in some cases, electricity may be produced by a fuel cell. Fuel cell may include any fuel cell described in this disclosure, for example with reference to FIGS. 2A-4. Fuel cell may be fueled by one or more of first fuel or second fuel.

Figure 2A:
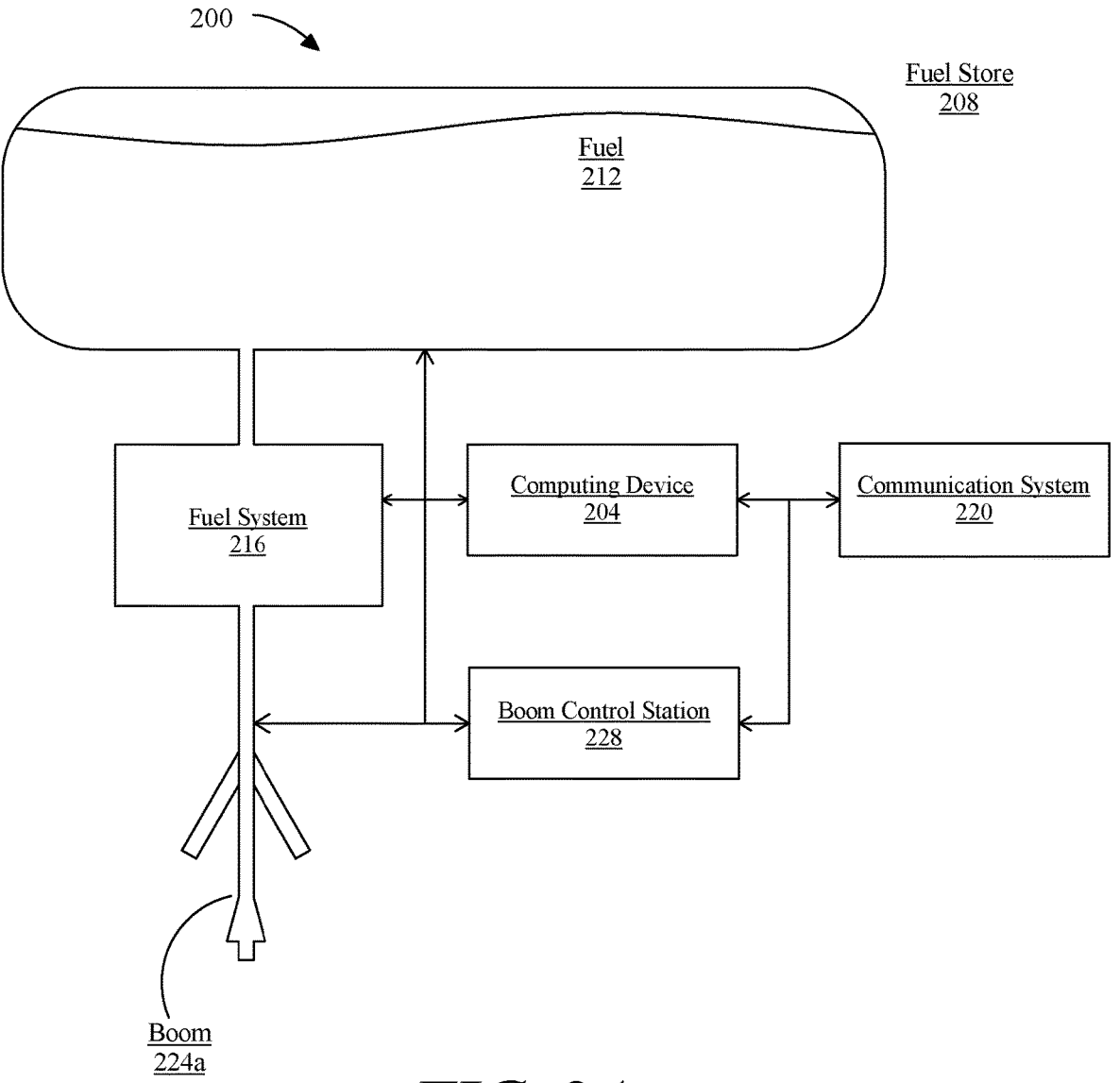
FIG. 2A is a block diagram of an exemplary fuel offloading system including a boom.
Figure 2B:
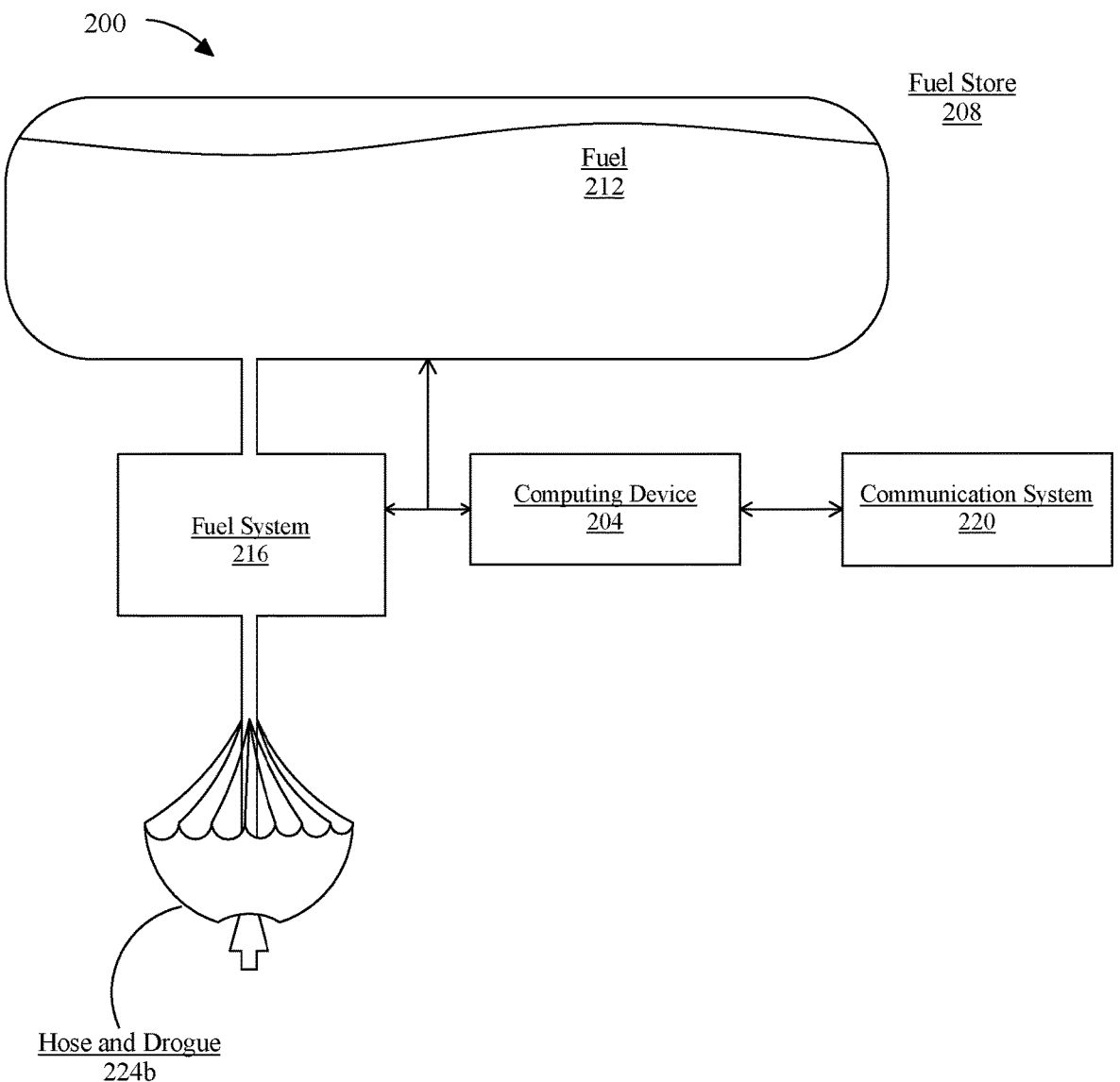
FIG. 2B is a block diagram of an exemplary fuel offloading system including a hose and drogue.

Still referring to FIGS. 2A-B, in some embodiments, propulsion system 132*a-b* may include an electric motor. Electric motor may be powered by one or more electricity sources, such as without limitation batteries and/or fuel cells. Additional disclosure related to fuel cell technology may be found in U.S. Pat. App. Ser. No. 17/478,724 title "BLENDED WING BODY AIRCRAFT WITH A FUEL CELL AND METHOD OF USE," filed on Sep. 17, 2021 and incorporated by reference, in its entirety, within this disclosure. In some cases, a fuel cell may provide steady state power for to propulsion system 132*a-b*, for example for cruise flight. Alternatively or additionally, a battery or another electricity source may provide supplemental power for climbing. In some cases, fuel cell may be configured to charge battery or another electricity source, when it produces excess power, for example during descent or ground operations.

Referring now to FIGS. 2A-B, exemplary fuel offloading systems 200 are illustrated by way of block diagrams. FIG. 2A illustrates an exemplary fuel offloading system 200 with a boom. FIG. 2B illustrates an exemplary fuel offloading system 200 with a hose and drogue. System 200 may include a computing device 204. Computing device 204 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 204 may include a single computing device operating independently, or may include two or more computing device operating in concert, in parallel, sequentially or the like; two or more computing devices may be included together in a single computing device or in two or more computing devices. Computing device 204 may interface or communicate with one or more additional devices as described below in further detail via a network interface device. Network interface device may be utilized for connecting computing device 204 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 204 may include but is not limited to, for example, a computing device or cluster of computing devices in a first location and a second computing device or cluster of computing devices in a second location. Computing device 204 may include one or more computing devices dedicated to data storage, security, distribution of traffic for load balancing, and the like. Computing device 204 may distribute one or more computing tasks as described below across a plurality of computing devices of computing device, which may operate in parallel, in series, redundantly, or in any other manner used for distribution of tasks or memory between computing devices. Computing device 204 may be implemented using a "shared nothing" architecture in which data is cached at the worker, in an embodiment, this may enable scalability of system 100 and/or computing device.

With continued reference to FIGS. 2A-B, computing device 204 may be designed and/or configured to perform any method, method step, or sequence of method steps in any embodiment described in this disclosure, in any order and with any degree of repetition. For instance, computing device 204 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 204 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIGS. 2A-B, fuel offloading system 200 may include a fuel store 208 configured to store a fuel 212. Fuel store 208 may include any fuel store described in this disclosure, including without limitation a tank, a bladder, a reservoir, or the like. In some embodiments, fuel store 208 may removably attached to tanker 100, for example within blended wing body 104. In some cases, fuel store 208 may be removably installed (along with fuel offloading system 200) in order to allow aircraft to operate as a tanker and removed for the aircraft to serve other purposes. In some cases, installation of fuel store 208 may be achieved by way of one or more cargo doors through which the fuel store 208 may enter blended wing body. Cargo door may include any door described in this disclosure, including with reference to FIG. 4. In some cases, tanker 100 may operate as a personnel or cargo transport, for instance with fuel offloading system 200 and/or fuel store 208 removed and or made inoperable. In some cases, fuel store 212 may include one or more fuel sensors, such as without limitation level sensors and/or temperature sensors. Fuel sensors may be in communication with computing device 204.

With continued reference to FIGS. 2A-B, fuel offloading system 200 may include a fuel system 216. As used in this disclosure, a "fuel system" is any system that is configured to provide for the conveyance of fuel. Fuel system 216 may include flow control devices, such as without limitation valves, regulators, and the like. As used in this disclosure, a "valve" is a component that controls fluidic communication between two or more components. Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of a fluidic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by computing device 204. Computing device 204 may be in communication with valve, for example by way of one or more of electrical communication, hydraulic communication, pneumatic communication, mechanical communication, and the like. In some cases, computing device 104 may be in communication with one or more components (e.g., valve, pump, sensors, and the like) by way of one or more networks, including for example wireless networks and controller area networks (CANs). Fuel system 216 may include pressurization or flow inducing devices, such as without limitation pumps. Pump may include a substantially constant pressure pump (e.g., centrifugal pump) or a substantially constant flow pump (e.g., positive displacement pump, gear pump, and the like). Pump can be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed. In some cases, pump may be communicative with computing device 204. Computing device 204 may control pump, for instance by way of a control signal. In some cases, fuel system 216 may include one or more fuel sensors. As used in this disclosure, a "fuel sensor" is a device that detects a fuel variable based upon a phenomenon associated with the fuel. Exemplary non-limiting fuel sensors include flow sensors, pressure sensors, level sensors, temperature sensors, and the like. Sensors may communicate with computing device 204 using one or more signals representative of fuel variable. Sensors and/or pumps may be in communication with computing device 204 by way of electrical communication, optical communication, mechanical communication, fluidic communication or the like. In some cases, components may be communicative with computing device 204 by way of at least a network, for example a local area network, a controller area network, or the like. In some cases, computing device 204 may be communicative by way of one or more communication protocols, such as without limitation ethernet, serial, and parallel communication protocols. As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIGS. 2A-B, fuel offloading system 200 may include a communication system 220. Communication system 220 may be configured to communicate with a device (e.g., communication system) on receiving aircraft (i.e., aircraft being refueled by tanker 100). Communication system 220 may communicate by way of radio communication, optical communication, cellular communication, satellite communication, or the like. In some cases, communication system 220 may include a network interface card; the communication system 220 may communicate by way of one or more networks. In some cases, information communicated by way of communication system 220 may be automatically generated, for example by computing device 204, flight controller, or the like. Alternatively or additionally, in some cases, information communicated by way of communication system 220 to receiving aircraft may be at least partially human generated, for instance by a crewmember of tanker 100. In some cases, communication system 220 may communicate by way of one or more signals.

With continue reference to FIGS. 2A-B, fuel offloading system 200 may include a fuel supply connection 224a-b. As used in this disclosure, a "fuel supply connection" is a fluidic conduit connecting fuel offloading system 200 and a receiving aircraft. As used in this disclosure, a "receiving aircraft" is an aircraft that has, is going to, or is currently being refueled by tanker 100 and is thus receiving. Tanker 100 may have one or more fuel supply connections 224a-b and therefore be able to fuel one or more receiving aircraft at a time. In some cases, tanker may have a fuel supply connection 224a-b generally at center of aircraft (as shown in FIG. 1). Alternatively or additionally, in some cases, tanker 100 may have a fuel supply connection 224a-b laterally aligned with a point along one or both wings (or transitions) and therefore off-center. In some cases, a fuel supply connection 224a-b may have a valve located at a distal end. Valve (e.g., poppet valve) may be configured to open automatically when fuel supply connection has mated with receiving vehicle. In some cases, toggles may connect fuel supply connection with receiving aircraft. In some cases, fuel supply connection 224a-b may mate with a (female) receptacle in receiving aircraft. Alternatively or additionally, fuel supply connection 224a-b may mate with a (male) probe in receiving aircraft.

Referring to FIG. 2A, fuel supply connection includes a boom 224a. As used in this disclosure a "boom" is a rigid fuel supply connection. Boom 224a may be configured to extend and insert into a receptacle on receiving aircraft. In some cases, boom 224a may include a flying boom. As used in this disclosure, a "flying boom" is a rigid, telescoping tube with movable flight control surfaces. In some cases, boom 224a may be operated by from a boom control station 228. In some cases, a boom operator may be located within boom control station 228 on tanker aircraft 100. Alternatively or additionally, boom control station 228 may be remotely located or include a computing device configured to automatically control boom 224a. In some cases, boom 224a may include flight control surfaces (e.g., small movable airfoils that are often in a V-tail configuration) configured to move the boom by through aerodynamic forces. In some cases, flight control surfaces may be actuated using an actuator and controlled from boom control station 228, for example by boom operator using a control stick. In some cases, boom 224a may telescope, effectively lengthening the boom 224a. Boom 224a may telescope through actuation of one or more actuators controlled from control station 228, for example by boom operator.

With continued reference to FIGS. 2A-B, an actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

With continued reference to FIGS. 2A-B, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases. are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIGS. 2A-B, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIGS. 2A-B, in some cases, actuator may include an electric actuator. Electric actuator may include any of electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least three different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIGS. 2A-B, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

Referring now to FIG. 2B, fuel supply connection may include a hose and drogue. As used in this disclosure, a "hose and drogue" is a flexible hose that trails from tanker aircraft 100. Drogue (i.e., para-drogue or basket) includes a fitting resembling a shuttlecock, attached with a valve to flexible hose. Drogue may stabilize hose in flight. In some cases, drogue may provide a funnel to aid insertion of receiver aircraft probe into the hose. In some cases, hose connects to a Hose Drum Unit (HDU). When not in use, hose/drogue may be reeled completely into HDU. In some cases, receiver aircraft has a probe, which is a rigid, protruding, pivotable, or retractable arm proximal the receiving aircraft's nose or fuselage to make fluidic connection with hose. In some embodiments, probe may be retractable and retracted when not in use.

Figure 3:
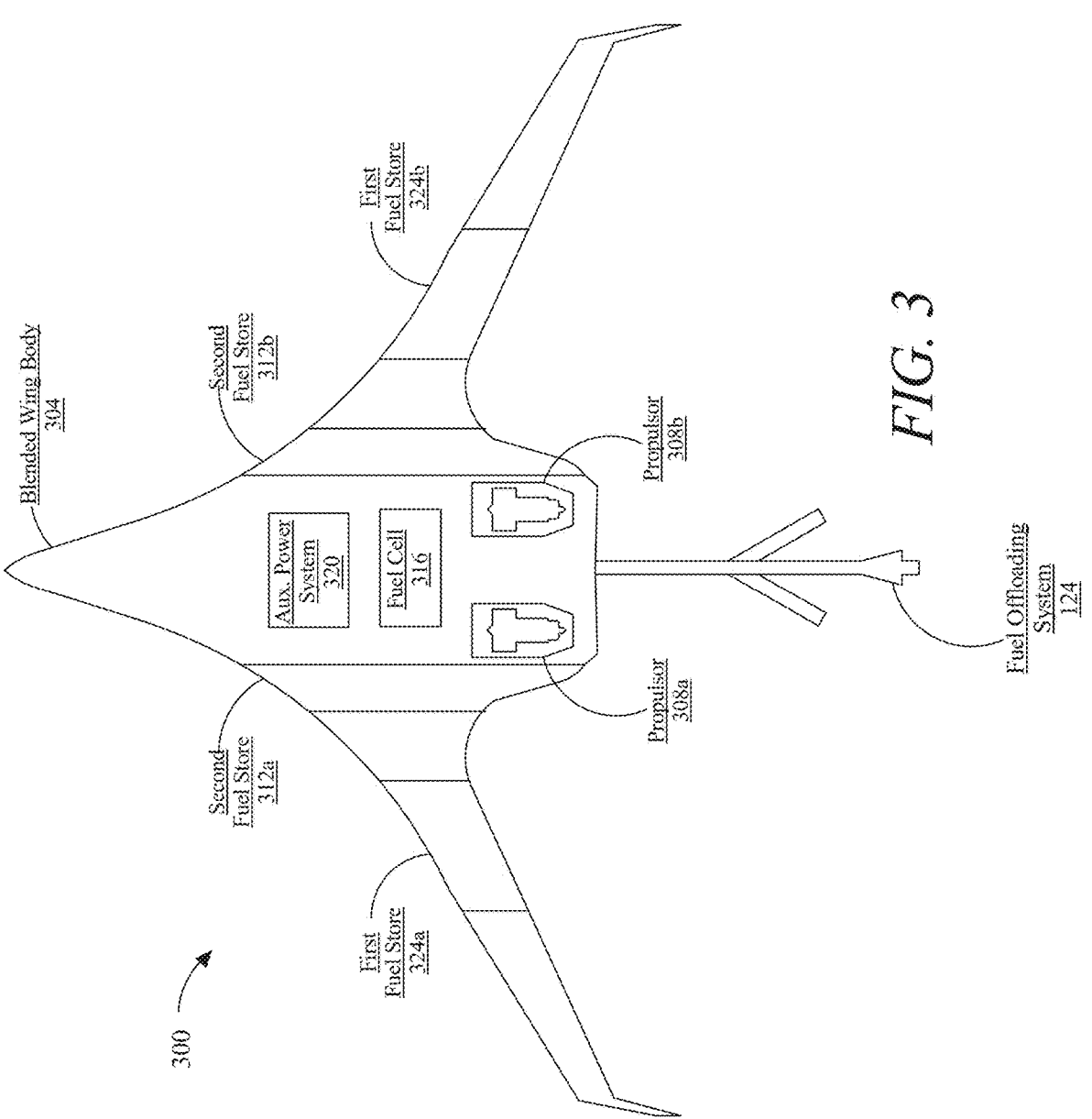
FIG. 3 is an exemplary blended wing body tanker having a fuel cell.

Referring now to FIG. 3, an exemplary top-down diagram of an exemplary blended wing tanker aircraft 300 is illustrated. Aircraft 300 may include a blended wing body 304. As described above, a blended wing body (BWB) is a fixed-wing aircraft body having no clear demarcation between wings and a main body of the aircraft, along a leading edge. For example, a BWB 304 aircraft may have distinct wing and body structures, which are smoothly blended together with no clear dividing line or boundary feature between wing and fuselage. As described above, a transitional portion of blended wing body 304 is the portion of the blended wing body 304 that includes the aircraft body between wing and a main body.

With continued reference to FIG. 3, aircraft 300 may include at least a propulsor 308*a-b* mechanically affixed to the aircraft 300. In some cases, at least a propulsor 308*a-b* may be configured to propel aircraft 300. Propulsor may include any propulsor described in this disclosure, for example with reference to FIG. 4. In some embodiments, at least a propulsor 308*a-b* may include at least a combustion engine that burns one or more of first fuel and second fuel and produces mechanical work. Resulting mechanical work may be used to power at least a propulsor 308*a-b*. In some embodiments, at least a propulsor 308*a-b* may include at least an electric motor operatively connected with fuel cell 316. Alternatively or additionally, propulsor 308*a-b* may be powered by one or more batteries. Batteries may include any batteries described in this disclosure. Propulsor 308*a-b* may be operatively connected to fuel cell 316 by way of electrical communication, for example through one or more conductors. In some cases, at least a fuel cell 316 may be configured to power at least an electric motor of propulsor 308*a-b*. In some embodiments, at least a propulsor 308*a-b* may include both a combustion engine and an electric motor.

Still referring to FIG. 3, in some embodiments, aircraft 300 may include a first fuel store 324*a-b*. In some cases, first fuel store 324*a-b* may be configured to store a first fuel. In some cases, first fuel may be different than another second fuel. First fuel may include any fuel described in this disclosure, including without limitation kerosene-based fuels. In some cases, at least a propulsor 308*a-b* may include at least a combustion engine configured to burn first fuel thereby producing mechanical work, which is used to power the at least a propulsor 308*a-b*. In some cases, first fuel store may be operatively connected to a fuel offloading system 200 and used to refuel another aircraft.

With continued reference to FIG. 3, aircraft 300 may include at least a second fuel store 312*a-b*. At least a second fuel store 312*a-b* may be configured to store a second fuel. Second fuel may include any fuel taught in this disclosure, for example without limitation liquid hydrogen, liquid natural gas, gasoline-based fuels, kerosene-based fuels and the like. In some embodiments, second fuel store 312*a-b* may be at least partially located within one or more of main body and a transitional portion of blended wing body 304. According to some embodiments, second fuel store may be configured to store one or more of liquid hydrogen and natural gas. For example, although weight energy density of liquid hydrogen is high, volume energy density of liquid hydrogen is lower than conventional aviation fuels. For this reason, in some cases, fuel store 312*a-b* may be located within a transitional portion of blended wing body 304 as greater volume for storage is available here, for example when compared to a wing portion. In some cases, liquid hydrogen may need to be stored at extremely cold temperatures, for instance without limitation at a temperature below −252° C. As liquid hydrogen warms it boils off and is lost. As a result, boil off rate is considered when employing liquid hydrogen as a fuel. In some cases, second fuel store 312, or any fuel store containing liquid hydrogen, may be heavily insulated. For example, in some cases, fuel store may include an inner wall and an outer wall with a vacuum chamber disposed between the inner wall and the outer wall. Vacuum within vacuum chamber prevents convective and conductive heat loss between inner and outer wall, so that substantially only radiative heat transfer may be possible between the two walls dramatically slowing heat transfer (and heating). Alternatively or additionally, in some cases, an insulation may be located between inner wall and outer wall of fuel store. Exemplary non-limiting insulations include high loft materials, silica aerogel, polyurethane, polystyrene, fiberglass, and the like. In some cases, a reflective material may be used within a wall of fuel store to slow radiative heat transfer, for example without limitation metallic materials with high polish like foil.

In some cases, a voluminous fuel store 312*a-b*, for instance located within a transitional portion of blended wing body 304, may be advantageous for liquid hydrogen (or liquid natural gas) storage as it slows a rate of temperature rise of fuel. For instance, heat transfer is a function of surface area of fuel store and may be understood according to Newton's Law of Cooling. Whereas thermal compliance is a function of mass (volume multiplied by density). As a fuel store increases in size, its volume increases more than surface area. This phenomenon may be understood as square-cube law, stated thus when an object undergoes a proportional increase in size, its new surface area is proportional to the square of the multiplier and its new volume is proportional to the cube of the multiplier. For example, imagine a cubic fuel store increases from a first length, h, to a second length, $l_2$. An area of fuel store may increase thus:

$$A_2 = A_1 \left( \frac{l_2}{l_1} \right)^2$$

and a volume of fuel store increases thus $$V_2 = V_1 \left( \frac{l_2}{l_1} \right)^3$$

where $A_1$ is first surface area, $A_2$ is second surface area, $V_1$ is first volume, and $V_2$ is second volume. For example, a cube with a side length of 1 meter has a surface area of 6 $m^2$ and a volume of 1 $m^3$. If dimensions of cube were multiplied by 2, its surface area would be multiplied by the square of 2 and become 24 $m^2$. Its volume would be multiplied by cube of 2 and become 8 $m^3$. The original cube (1 m sides) has a surface area to volume ratio of 6:1. The larger (2 m sides) cube has a surface area to volume ratio of (24/8) 3:1. As dimensions increase, volume will continue to grow faster than surface area. Square-cube principle applies to all solids, not just cubes.

With continued reference to FIG. 3, aircraft 300 may include at least a fuel cell 316. In some cases, at least a fuel cell 316 may be configured to combine second fuel with an oxidizing agent, such as oxygen to produce electricity. At least a fuel cell 316 may include any fuel cell described in this disclosure, including without limitation with reference to FIG. 4 below. Additional disclosure related fuel cells may be found in U.S. patent application Ser. No. 17/478,724 titled "BLENDED WING BODY AIRCRAFT WITH A FUEL CELL AND METHOD OF USE," filed on 17 Sep. 2021; the entirety of which is incorporated herein by reference.

Still referring to FIG. 3, in some embodiments aircraft 300 may additionally include an auxiliary power system 320 operatively connected with at least a fuel cell 316. As used in this disclosure, an "auxiliary power system" is a power system, such as without limitation an electrical circuit or mechanical power source, that provides electrical energy to non-propulsor flight components of an aircraft. Exemplary non-limiting non-propulsor flight component include an avionic system, a flight control system, an environmental control system, and anti-ice system, a lighting system, a fuel system, a braking system, and/or a landing gear system. Auxiliary power system 320 may be operatively connected to fuel cell 316 by way of electrical communication, for example through one or more conductors. In some cases, at least a fuel cell 316 may be configured to power auxiliary power system 320. In some cases, auxiliary power system 320 may include a motor configured to convert electric energy to mechanical work. In some cases, motor may be used to operate a compressor, for instance of air conditioning or refrigeration system. In some cases, auxiliary power system 320 may include a motor that is configured to start a combustion engine of at least a propulsor 308a-b.

Still referring to FIG. 3, in some embodiments, one or more of second fuel store 312a-b and first fuel store 324a-b may include at least a fuel environment control mitigation. As used in this disclosure, a "fuel environment mitigation" is any design parameter selected to control an environmental factor associated with fuel within a fuel store. In some cases, fuel environment control mitigation may include a design parameter that affects one or more of fuel pressure, fuel temperature, fuel phase, and the like. For example, in some cases, a fuel environment control mitigation may include insulation to control fuel temperature. Additionally or alternatively, in some cases, fuel environment control mitigation may include a pressure vessel within which fuel pressure may be controlled.

Figure 4:
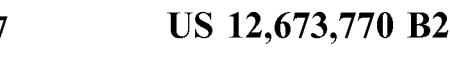
FIG. 4 is a schematic of an exemplary blended wing aircraft.

Referring to FIG. 4, an exemplary blended wing aircraft 400 is illustrated. Aircraft 400 may include a blended wing body 404. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft along a leading edge of the aircraft. For example, a BWB 404 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 404 design may or may not be tailless. One potential advantage of a BWB 404 may be to reduce wetted area and any accompanying drag associated with a conventional wing-body junction. In some cases, a BWB 404 may also have a wide airfoil-shaped body, allowing entire aircraft to generate lift and thereby facilitate reduction in size and/or drag of wings. In some cases, a BWB 404 may be understood as a hybrid shape that resembles a flying wing, but also incorporates features from conventional aircraft. In some cases, this combination may offer several advantages over conventional tube-and-wing airframes. In some cases, a BWB airframe 404 may help to increase fuel economy and create larger payload (cargo or passenger) volumes within the BWB. BWB 404 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 4, BWB 404 of aircraft 400 may include a nose portion. A "nose portion," for the purposes of this disclosure, refers to any portion of aircraft 400 forward of the aircraft's fuselage 416. Nose portion may comprise a cockpit (for crewed aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions. In some exemplary embodiments, nose may be configured to house landing gear, e.g., nose landing gear. Landing gear may include any landing gear described in this disclosure.

With continued reference to FIG. 4, BWB 404 may include at least a structural component of aircraft 400. Structural components may provide physical stability during an entirety of an aircraft's 400 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports 418 around a window configured to provide extra stability around weak points in a vehicle's structure, such as an opening where a window is installed. Where multiple pillars are disposed in an aircraft's 400 structure, they may be so named A, B, C, and so on named from nose to tail. Pillars, like any structural element, may be disposed a distance away from each other, along an interior of aircraft 400 and BWB 404. Depending on manufacturing method of BWB 404, pillars may be integral to frame and skin, comprised entirely of internal framing, or alternatively, may be only integral to structural skin elements. Structural skin will be discussed in greater detail below.

With continued reference to FIG. 4, BWB 404 may include a plurality of materials, alone or in combination, in its construction. At least a BWB 404, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 404 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 404 may additionally or alternatively use wood or another suitably strong yet light material for an internal structure.

With continued reference to FIG. 4, aircraft 400 may include monocoque or semi-monocoque construction. BWB 404 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In some cases, carbon fiber is beneficial, because of high compressive strength. Where high compressive strength is not needed, in some cases, other high strength fibers may be used. Exemplary high strength fibers include without limitation aramid (i.e., Kevlar), Technora, and Spectra. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others. Aircraft structure may be configured to contain pressure and resist cabin de-pressurization.

With continued reference to FIG. 4, BWB 404 may include at least a fuselage 416. A "fuselage," for the purposes of this disclosure, refers to a main body of an aircraft 400, or in other words, an entirety of the aircraft 400 except for nose, wings, empennage, nacelles, and control surfaces. In some cases, fuselage 416 may contain an aircraft's payload. At least a fuselage 416 may comprise structural components that physically support a shape and structure of an aircraft 400. Structural components may take a plurality of forms, alone or in combination with other types. Structural components vary depending on construction type of aircraft 400 and specifically, fuselage. A fuselage 412 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin 428 may comprise a plurality of materials such as plywood sheets, aluminum, fiberglass, and/or carbon fiber.

With continued reference to FIG. 4, in embodiments, at least a fuselage 416 may comprise geodesic construction. Geodesic structural elements may include stringers 420 wound about formers 424 (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former 424 (or station frame) can include a rigid structural element that is disposed along a length of an interior of a fuselage 416 orthogonal to a longitudinal (nose to tail) axis of aircraft 400. In some cases, a former 424 forms a general shape of at least a fuselage 416. A former 424 may include differing cross-sectional shapes at differing locations along a fuselage 416, as the former is a structural component that informs an overall shape of the fuselage. In embodiments, aircraft skin 428 can be anchored to formers 424 and stringers 420 such that an outer mold line of volume encapsulated by the formers and stringers comprises a same shape as aircraft 400 when installed. In other words, former (s) 424 may form a fuselage's ribs, and stringers may form interstitials between the ribs. A spiral orientation of stringers 420 about formers 424 may provide uniform robustness at any point on an aircraft fuselage such that if a portion sustains damage, another portion may remain largely unaffected. Aircraft skin 428 may be mechanically coupled to underlying stringers and formers and may interact with a fluid, such as air, to generate lift and perform maneuvers.

With continued reference to FIG. 4, according to some embodiments, a fuselage 428 can comprise monocoque construction. Monocoque construction can include a primary structure that forms a shell (or skin in an aircraft's case) and supports physical loads. Monocoque fuselages are fuselages in which the aircraft skin 428 or shell may also include a primary structure. In monocoque construction aircraft skin would support tensile and compressive loads within itself and true monocoque aircraft can be further characterized by an absence of internal structural elements. Aircraft skin 428 in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 4, according to some embodiments, a fuselage 416 may include a semi-monocoque construction. Semi-monocoque construction, as used in this disclosure, is used interchangeably with partially monocoque construction, discussed above. In semi-monocoque construction, a fuselage 416 may derive some structural support from stressed aircraft skin 428 and some structural support from underlying frame structure made of structural components. Formers 424 or station frames can be seen running transverse to a long axis of fuselage with circular cutouts which may be used in real-world manufacturing for weight savings and for routing of electrical harnesses and other modern on-board systems. In a semi-monocoque construction, stringers 420 may be thin, long strips of material that run parallel to a fuselage's long axis. Stringers 420 can be mechanically coupled to formers 424 permanently, such as with rivets. Aircraft skin 428 can be mechanically coupled to stringers 420 and formers 424 permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers 424 and stringers 420, constructed in one piece, integral to an aircraft skin 428. In some cases, stringers 420 and formers 424 may account for a bulk of any aircraft structure (excluding monocoque construction). Stringers 420 and formers 424 can be arranged in a plurality of orientations depending on aircraft operation and materials. Stringers may be arranged to carry axial (tensile or compressive), shear, bending or torsion forces throughout their overall structure. Due to their coupling to aircraft skin 428, aerodynamic forces exerted on aircraft skin 428 may be transferred to stringers 420. Location of said stringers 420 greatly informs type of forces and loads applied to each and every stringer 420, all of which may be accounted for through design processes including, material selection, cross-sectional area, and mechanical coupling methods of each member. Similar methods may be performed for former assessment and design. In general, formers 424 may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 4, in some cases, a primary purpose for a substructure of a semi-monocoque structure is to stabilize a skin. Typically, aircraft structure is required to have a very light weight and as a result, in some cases, aircraft skin 428 may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers 420 which stabilize the skin. Fuselages are similar with bulkheads or frames, and stringers.

With continued reference to FIG. 4, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 4, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 404. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 4, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 400 is in its level flight orientation or sitting on ground. A post may act similarly to stringer in that it is configured to support axial loads in compression due to a load being applied parallel to its axis due to, for example, a heavy object being placed on a floor of aircraft 400. A beam may be disposed in or on any portion a fuselage that requires additional bracing, specifically when disposed transverse to another structural element, like a post, which would benefit from support in that direction, opposing applied force. A beam may be disposed in a plurality of locations and orientations within a fuselage as necessitated by operational and constructional requirements.

With continued reference to FIG. 4, aircraft 400 may include at least a flight component 408. A flight component 408 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 400 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 400. In some embodiments, at least a flight component 408 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 4, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 4, at least a flight component may be one or more devices configured to affect aircraft's 400 attitude. "Attitude", for the purposes of this disclosure, is the relative orientation of a body, in this case aircraft 400, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 400. A plurality of attitude datums may indicate one or more measurements relative to an aircraft's pitch, roll, yaw, or throttle compared to a relative starting point. One or more sensors may measure or detect an aircraft's 400 attitude and establish one or more attitude datums. An "attitude datum", for the purposes of this disclosure, refers to at least an element of data identifying an attitude of an aircraft 400.

With continued reference to FIG. 4, in some cases, aircraft 400 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 4, in some cases, aircraft 400 may include at least a pilot control. As used in this disclosure, a "pilot control," is an interface device that allows an operator, human or machine, to control a flight component of an aircraft. Pilot control may be communicatively connected to any other component presented in aircraft 400, the communicative connection may include redundant connections configured to safeguard against single-point failure. In some cases, a plurality of attitude datums may indicate a pilot's instruction to change heading and/or trim of an aircraft 400. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 400. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 408 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 4, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 408. At least a flight component 408 may include any propulsor as described herein. In embodiment, at least a flight component 408 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 4, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 4, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 4, at least a flight component 408 may include wings, empennages, nacelles, control surfaces, fuselages, and landing gear, among others, to name a few. In embodiments, an empennage may be disposed at the aftmost point of an aircraft body 404. Empennage may comprise a tail of aircraft 400, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 400 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 400 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 404 aircraft 400 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 408 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 408 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 400. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 400 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 4, aircraft 400 may include an energy source. Energy source may include any device providing energy to at least a flight component 408, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 4, in further nonlimiting embodiments, an energy source may include a fuel store. As described above a fuel store is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 404 of aircraft 400, for example without limitation within a wing portion 412 of blended wing body 408. Aviation fuels may include petroleum-based fuels, or petroleum and synthetic fuel blends, used to power aircraft 400. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 400. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 4, modular aircraft 400 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 4, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 4 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 4, aircraft 400 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 4, aircraft 400 may include multiple flight component 408 sub-systems, each of which may have a separate energy source. For instance, and without limitation, one or more flight components 408 may have a dedicated energy source. Alternatively, or additionally, a plurality of energy sources may each provide power to two or more flight components 408, such as, without limitation, a "fore" energy source providing power to flight components located toward a front of an aircraft 400, while an "aft" energy source provides power to flight components located toward a rear of the aircraft 400. As a further non-limiting example, a flight component of group of flight components may be powered by a plurality of energy sources. For example, and without limitation, two or more energy sources may power one or more flight components;

two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 408. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 4, aircraft 400 may include a flight component 408 that includes at least a nacelle 408. For the purposes of this disclosure, a "nacelle" is a streamlined body housing, which is sized according to that which is houses, such as without limitation an engine, a fuel store, or a flight component. When attached by a pylon entirely outside an airframe 404 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 400 partially or wholly enveloped by an outer mold line of the aircraft 400. At least a nacelle may be designed to be streamlined. At least a nacelle may be asymmetrical about a plane comprising the longitudinal axis of the engine and the yaw axis of modular aircraft 400.

With continued reference to FIG. 4, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 4, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 4, in nonlimiting embodiments, at least a flight component 408 may include an airbreathing engine such as a jet engine, turbojet engine, turboshaft engine, ramjet engine, scramjet engine, hybrid propulsion system, turbofan engine, or the like. At least a flight component 408 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 4, an aircraft 400 may include a flight controller. As used in this disclosure, a "flight controller" is a device that generates signals for controlling at least a flight component 408 of an aircraft 400. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 4, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 400 and/or computing device.

With continued reference to FIG. 4, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

A table is provided below with exemplary parameters and ranges for further understanding of the disclosure.

| | Minimum | Nominal | Maximum |
|---|---|---|---|
| No. of fuel supply connections | 1 | 3 | 10 |
| No. of booms | 0 | 1 | 10 |
| Separation distance between booms | 0 ft (single boom) | 65 ft | 100 ft |
| No. of hose and drogues | 0 | 1 | 10 |
| Separation distance | 0 | 65 | 100 |

-continued

| | Minimum | Nominal | Maximum |
|---|---|---|---|
| between hose and drogues | | | |
| No. of fuel types | 1 | 2 | 5 |
| No. of propulsors | 1 | 2 | 100 |
| Offload Radius | 50 nautical miles | 3,000 nautical miles | 10,000 nautical miles |
| Fuel Offloading Capacity | 10 lb (UAV concept) | 100,000 lb | 1,000,000 lb |
| Cargo ceiling height | 0 ft | 8.33 ft | 14 ft |
| Fuel to cargo ratio | 0.5 | 1.5 | Infinity (no cargo) |
| Take-off field length | 0 ft (catapult launch or VTOL) | 7,000 ft | 12,000 ft |
| Total payload | 10 1b | 100,000 lb | 1,000,000 lb |
| Fuel types | Kerosene-based, gasoline-based, electricity (battery stored), liquid hydrogen, and liquid natural gas. | | |
| Freightage | Personnel, cargo, fuel | | |
| Boom station view | Direct (e.g., through transparent panel), indirect (e.g., through camera and video display) | | |
| Tanker refuellable by another tanker | Tanker refuellable, non-tanker refuellable | | |

Discussion of tanker related design considerations is provided below to further explain the present disclosure. In some embodiments, tanker design may include consideration of the following. Tanker design may include selection of number of booms (BWB tanker may refuel multiple aircraft simultaneously), location of booms (a selected separation may be needed to refuel multiple aircraft simultaneously), selection of number of hose-drogues, and location of hose-drogues. In some embodiments, tanker design may include boom operator station design, including, without limitation, consideration of location of station(s), consideration of provision of multiple boom operator stations, ability to refuel multiple aircraft, direct or indirect view, and the like. In some embodiments, tanker design may considerations related to ability of the tanker to carry both fuel and cargo, including, without limitation, selected cargo volume, selected ceiling height, selected fuel volume, selected total payload weight, size and number of cargo doors, and the like. In some embodiments, tanker design may include consideration of airdrop capacity and capability, including, without limitation, airdrop compatibility with boom(s)/hose-drogue(s) installation, consideration of airdrop while refueling (with boom(s) and/or with drogue(s)), and the like. In some cases, design of tanker may include consideration of takeoff and landing field length. In some cases, design of tanker may include consideration of observability, including without limitation radar cross section, acoustic signature. In some embodiments, design of tanker may include consideration of tanker to be refueled by another tanker. In some embodiments, design of tanker may include consider of tanker's radius versus offload capability.

Additional disclosure is provided below to further describe the disclosure and some exemplary embodiments. In some embodiments, tanker 100 may be powered by liquid hydrogen (LH2) and deliver kerosene-based fuel to receiving aircraft. In some cases, an LH2-powered BWB tanker can deliver more fuel to a greater radius than a kerosene-powered BWB tanker. As described above, LH2 is relatively lighter and thus permits BWB to carry greater kerosene-based fuel weight without sacrificing range. Alternatively or additionally, in some cases, with a small sacrifice in kerosene-based fuel weight (and an equally small LH2 weight increase), tanker can offload fuel over longer ranges. In some embodiments, additional volume required by LH2 is accommodated by a comparatively large internal volume of BWB configuration. In some embodiments, BWB tanker may operate using LH2 fuel, providing energy for all of its own needs, such as without limitation propulsion systems, avionics, controls, environmental control systems, lighting, tanker systems, and the like.

In some embodiments, BWB tanker 100 may be configured to carry a relatively large quantity and weight of kerosene-based fuel. In some cases, this fuel may be accessible in flight by tanker systems including, without limitation, fuel lines, pumps, boom(s) and hose-and-drogue(s), tanker systems to permit offloading of fuel, boom operator station, and the like.

In some embodiments, BWB tanker 100 may be configured to transport cargo. For instance, BWB may be configured with cargo systems. Exemplary cargo systems may include without limitation one or more cargo compartments, cargo restraining means (e.g., cargo floor with rollers, rails, locks and the like), a forward cargo barrier (configured to protect pilots and crew), cargo doors and openings (configured to permit cargo to be loaded, distributed within the airplane, and unloaded), and the like.

In some embodiments, BWB tanker 100 may include a hybrid tanker. As used in this disclosure, a "hybrid tanker" is a tanker that may be powered by more than one energy (e.g., fuel) source. For instance, in an exemplary embodiment, an LH2 powered tanker may also be able to operate on kerosene-based fuel; as a result, the tanker could provide kerosene at even greater ranges, although that range would come at a cost of offload capability. In some cases, propulsion systems comprise at least an engine capable of operating using at least two different types of fuel (e.g., LH2 and kerosene-based fuel or LNG and kerosene-based fuel). In some cases, a hybrid tanker may have an added advantage of extremely great ferry ranges. As used in this disclosure, "ferrying" an airplane refers to flying an airplane to a destination without payload, for instance for the purpose of operational relocation or repositioning.

In yet another exemplary embodiment, tanker 100 may be powered using liquid natural gas (LNG) and may carry a kerosene-based fuel payload (e.g., Jet-A). Like LH2, LNG is less dense than kerosene-based fuels, but has a higher mass energy density (energy per unit weight). Although differences between LNG and kerosene-based fuel are not as great as differences between LH2 and kerosene-based fuel.

In still another exemplary embodiment, tanker 100 may be propelled by hydrogen and/or kerosene, while delivering only kerosene. In some cases, an engine configured to propel tanker 100 may operate on hydrogen and/or kerosene. In some cases, engine may be hot-swapped between fuels, for example while in flight and operating. In some cases, enabling tanker 100 to fly on kerosene can provide a benefit by extending its service radius, for instance at an expense of reduced fuel delivered. In some cases, enabling tanker 10 to fly on kerosene may enable the tanker to operate from bases that cannot provide hydrogen fuel. In some cases, enabling tanker 100 to fly with by consuming multiple fuel types (e.g., hydrogen and kerosene) allows multiple fuel types to be used for reserve fuel. Airplanes generally carry substantial reserve fuel sufficient to fly a certain distance or to sustain flight for a certain period. If tanker 100 can fly on two types of fuel, it may use either type for reserves. Hydrogen fuel is much lighter than kerosene so reserves in hydrogen may impose a reduced weight penalty to tanker 100, thereby improving performance. In some cases, tanker 100 fuel reserves may include hydrogen and/or natural gas.

In another exemplary embodiment, tanker 100 may be configured to deliver one or or more hydrogen and/or natural gas to another aircraft in-flight. In some cases, performance of certain types of airplanes may benefit from use of hydrogen fuel. For example, some long endurance reconnaissance or signal relay airplanes may benefit from hydrogen's light weight or its ability to be converted efficiently to electricity with a fuel cell. Such long endurance airplanes may benefit from in-flight refueling. Accordingly, in some cases, tanker 100 may be propelled by a first fuel, including kerosene and configured to deliver a second fuel, including one or more of hydrogen and natural gas.

In still another exemplary embodiment, tanker 100 may include one or more additional external fuel storage tanks. In some cases, external storage tanks may be mounted to an underside of a blended wing body tanker 100, for instance under main body or wings. Alternatively or additionally, in some cases, external storage tanks may be mounted to a topside of a blended wing body tanker 100, for instance on top of main body or wings. Alternatively or additionally, an external tank may be mounted aft of a blended wing body tanker 100, for instance aft of main body or wings. In some cases, external tanks may optionally include a means of offload, for example a hose-and-drogue system. In some cases, external tanks may be aerodynamically shaped, for instance into a shape of a canoe or torpedo. In some cases, an external fuel tank may increase fuel storage by 1,000 to 100,000 kilograms for instance about 10,000 kilograms, about 20,000 kilograms, or about 30,000 kilograms. External fuel tanks may be configured to store any fuel described in this disclosure, for example kerosene-based fuels, hydrogen, and/or natural gas.

In still another embodiment, oxygen content of ullage within one or more fuel tanks is controlled (e.g., minimized). As used in this disclosure, "ullage" is empty volume within a tank (i.e., store or storage). In some cases, oxygen content may be reduced by addition of one or more inert gases, for example nitrogen. In some cases, one or more inert gases may be provided by a dedicated system. In some cases, one or more fuel tanks (i.e., stores) configured to carry a kerosene-based fuel or a gasoline-based fuel may be mounted to a dedicated system to control Oxygen content in ullage by filling the ullage with inert gas; this act may be referred to within this disclosure as "fuel tank inerting".

Figure 5:
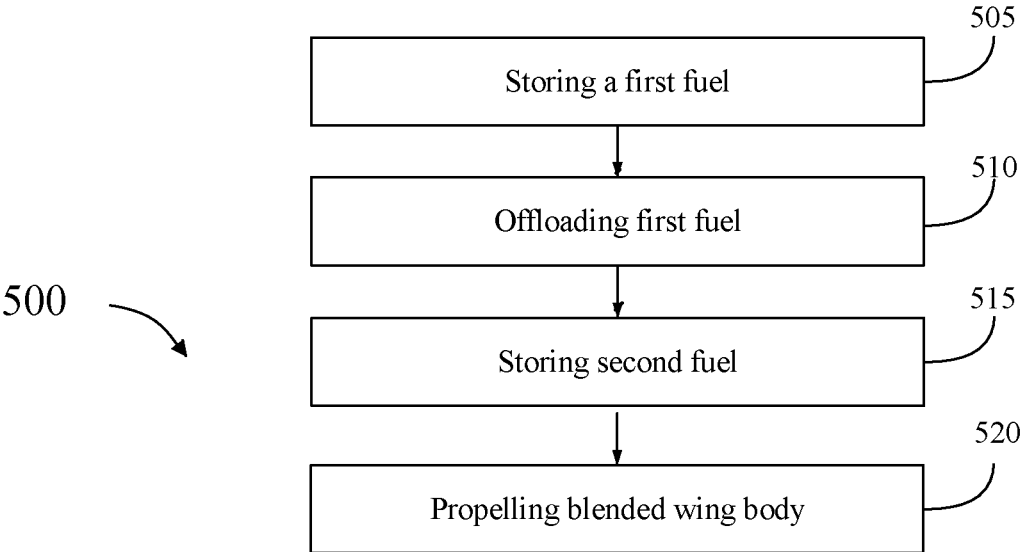
FIG. 5 is a flow diagram of an exemplary method of use for a blended wing body tanker.

Referring now to FIG. 5 an exemplary method 500 of use for a blended wing body tanker is illustrated by way of flow diagram. At step 505, method 500 may include storing, using a first fuel store located within a blended wing body, a first fuel. First fuel store may include any fuel store described in this disclosure, for example with reference to FIGS. 1-4. First fuel may include any fuel described in this disclosure, for example with reference to FIGS. 1-4. In some embodiments, first fuel may include a kerosene-based fuel.

With continued reference to FIG. 5, at step 510, method 500 may include offloading, using a fuel offloading system operatively connected to first fuel store, first fuel to another aircraft in flight. Fuel offloading system may include any fuel offloading system described in this disclosure, for example with reference to FIGS. 1-4.

With continued reference to FIG. 5, at step 515, method 500 may include storing, using a second fuel store located within blended wing body, a second fuel different from first fuel. Second fuel store may include any fuel store described in this disclosure, for example with reference to FIGS. 1-4. Second fuel may include any fuel described in this disclosure, for example with reference to FIGS. 1-4. In some embodiments, second fuel may include a liquid hydrogen fuel. In some embodiments, second fuel may include a liquid natural gas.

With continued reference to FIG. 5, at step 520, method 500 may include propelling, using a propulsion system powered by second fuel, blended wing body. Propulsion system may include any propulsion system described in this disclosure, for example with reference to FIGS. 1-4.

Still referring to FIG. 5, in some embodiments, method 500 may additionally include limiting heat transfer to second fuel using an insulated wall, for example, of second fuel store. Insulated wall may include any insulated wall or thermal insulation described in this disclosure, for example with reference to FIGS. 1-4. In some cases, insulated wall may include a vacuum. Vacuum may include any vacuum described in this disclosure, for example with reference to FIGS. 1-4. In some cases, insulated wall may include an insulation. Insulation may include any insulation described in this disclosure, for example with reference to FIGS. 1-4.

Still referring to FIG. 5, in some embodiments, method 500 may additionally include fueling an engine of propulsion system with second fuel. Engine may include any engine described in this disclosure, for example with reference to FIGS. 1-4.

Still referring to FIG. 5, in some embodiments, method 500 may additionally include powering a motor of the propulsion system with electricity derived from the second fuel. Motor may include any motor described in this disclosure, for example with reference to FIGS. 1-4. In some cases, method 500 may further include producing electricity using a fuel cell fueled by second fuel. Fuel cell may include any fuel cell described in this disclosure, for example with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
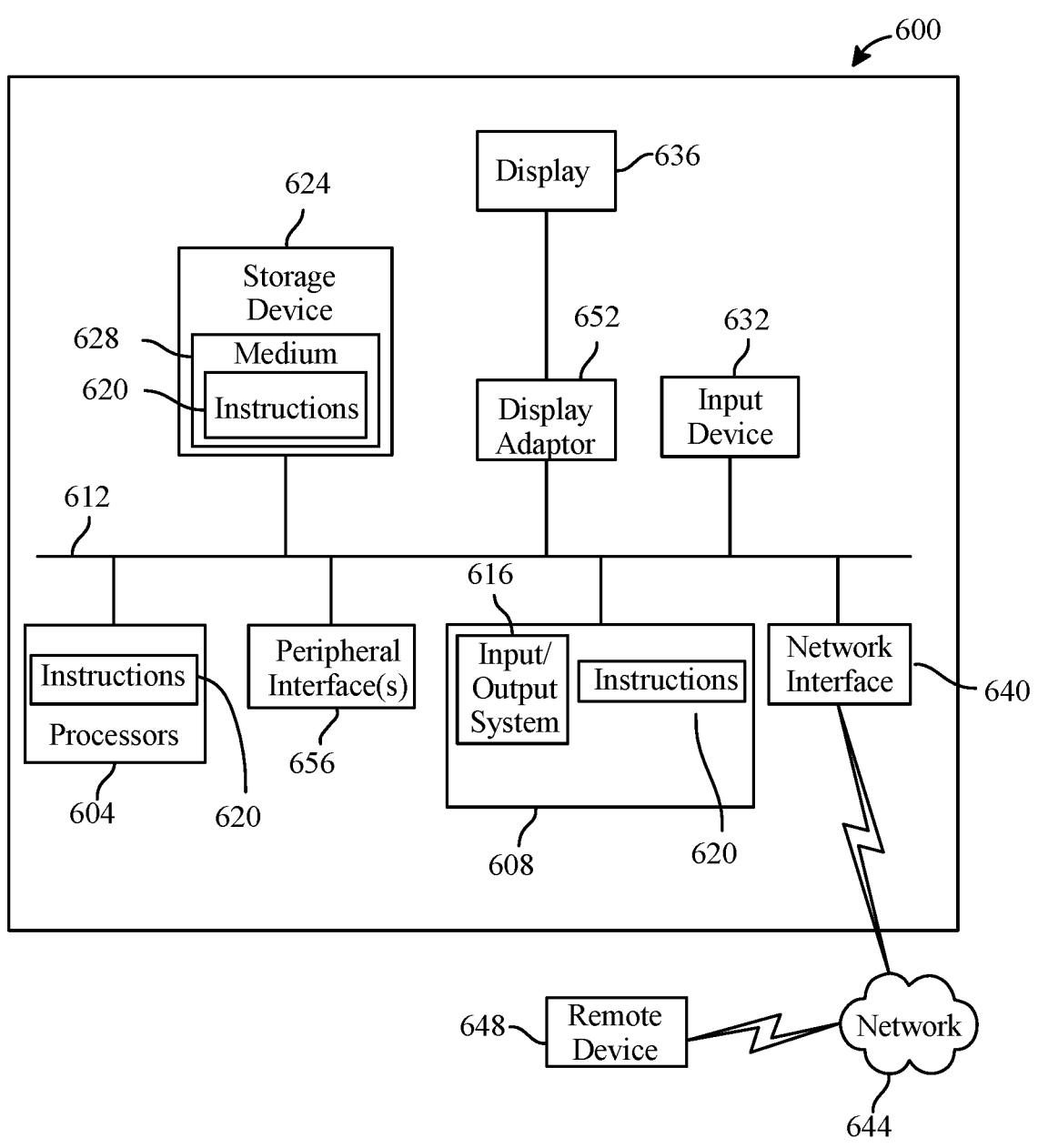
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body tanker comprising:
an aircraft having a blended wing body, the blended wing body comprising:
a fuselage comprising a semi-monocoque construction, wherein the fuselage comprises:
formers disposed along a length of an interior of the fuselage and forming a shape of the fuselage, wherein the formers are orthogonal to a longitudinal axis of the aircraft; and
stringers coupled to the formers;
an aircraft skin coupled to the stringers and the formers, wherein aerodynamic forces exerted on the aircraft skin are transferred to the stringers and wherein a volume of the aircraft is encapsulated by the formers and the stringers and comprise a same shape as the aircraft; and
vertical supports integral to the aircraft skin and a frame of the aircraft;
a first fuel store disposed within an interior cavity of the fuselage of the aircraft and configured to store a first fuel;

a fuel offloading system operatively connected to the first fuel store and configured to offload the first fuel to a second aircraft in flight, wherein the fuel offloading system comprises:
a fuel supply connection laterally aligned with a point along at least one wing, wherein the fuel supply connection comprises a flying boom, and wherein the flying boom comprises one or more flight control surfaces; and
a valve located at a distal end configured to automatically open when the flying boom is to mate with a receiving aircraft;
a second fuel store disposed within the interior cavity of the fuselage of the aircraft and configured to store a second fuel;
wherein each of the first fuel store and the second fuel store comprises at least one temperature sensor;
wherein the first fuel store and the second fuel store are positioned adjacent to one another;
a hybrid propulsion system mechanically affixed to the aircraft and comprising a fuel cell configured to combine the first fuel with oxygen to produce electricity and charge an electricity source as a function of excess produced power and the electricity, wherein the hybrid propulsion system is:
operatively connected to the first fuel store and the second fuel store;
configured to be powered by the first fuel and the second fuel;
configured to propel the blended wing body; and
such that the first fuel store is configured to be used by both the fuel offloading system for refueling the second aircraft in flight, and for powering the hybrid propulsion system; and
an auxiliary power system operatively connected with the fuel cell, wherein the fuel cell is configured to power the auxiliary power system, wherein the auxiliary power system is configured to power control surfaces.

2. The blended wing body tanker of claim 1, wherein the second fuel store comprises an insulated outer wall and wherein the insulated outer wall is configured to limit heat transfer to the second fuel.

3. The blended wing body tanker of claim 1, further comprising the fuel cell fueled by the second fuel and configured to electricity.

4. The blended wing body tanker of claim 1, wherein the blended wing body tanker comprises a boom control station configured to operate the flying boom.

5. The blended wing body tanker of claim 1, wherein the vertical supports comprise pillars.

6. The blended wing body tanker of claim 1, wherein the aircraft skin comprises a structural skin configured to bear at least a portion of the aerodynamic forces exerted on the aircraft skin.

7. The blended wing body tanker of claim 1, wherein the blended wing body tanker comprises an offload radius of at least 3,0000 nautical miles.

8. The blended wing body tanker of claim 1, wherein the blended wing body tanker comprises a fuel offloading capacity of at least 100,000 pounds.

9. The blended wing body tanker of claim 1, wherein the blended wing body tanker comprises a maximum fuel take-off length of 7,000 feet.

10. The blended wing body tanker of claim 1, further comprising a transparent panel structured to allow for a direct view of the flying boom.

11. The blended wing body tanker of claim 1, wherein the blended wing body tanker comprises a fuel to cargo ratio of at least 1.5.

12. The blended wing body tanker of claim 1, wherein the first fuel store is located in a wing of the blended wing body.

13. The blended wing body tanker of claim 12, wherein the second fuel store is located in a main body of blended wing body.

14. The blended wing body tanker of claim 1, wherein the blended wing body tanker comprises more than one fuel supply connections, wherein each fuel supply connection comprises a separate flying boom.

15. The blended wing body tanker of claim 14, wherein a first flying boom of the more than one fuel supply connections is separated from a second flying boom of the more than one fuel supply connections by a distance of at least 65 feet.

16. A method of use for a blended wing body tanker, the method comprising:

receiving an aircraft comprising a blended wing body, wherein the blended wing body comprises:

a fuselage comprising a semi-monocoque construction, wherein the fuselage comprises:

formers disposed along a length of an interior of the fuselage and forming a shape of the fuselage, wherein the formers are orthogonal to a longitudinal axis of the aircraft; and stringers coupled to the formers;

an aircraft skin serving coupled to the stringers and the formers, wherein aerodynamic forces exerted on the aircraft skin are transferred to the stringers and wherein a volume of the aircraft is encapsulated by the formers and the stringers and comprise a same shape as the aircraft; and vertical supports integral to the aircraft skin and a frame of the aircraft;

storing, using a first fuel store disposed within an interior cavity of the fuselage of the aircraft, a first fuel;

offloading, using a fuel offloading system operatively connected to the first fuel store, the first fuel to a second aircraft in flight, wherein the fuel offloading system comprises a fuel supply connection laterally aligned with a point along at least one wing, wherein the fuel supply connection comprises a flying boom wherein the flying boom comprises one or more flight control surfaces, and a valve located at a distal end configured to automatically open when the flying boom is to mate with a receiving aircraft;

storing, using a second fuel store disposed within the interior cavity of the fuselage of the aircraft, a second fuel;

wherein each of the first fuel store and the second fuel store comprises at least one temperature sensor;

wherein the first fuel store and the second fuel store are positioned adjacent to one another;

propelling, using a hybrid propulsion system mechanically affixed to the aircraft and comprising a fuel cell configured to combine the first fuel with oxygen to produce electricity, wherein the hybrid propulsion system configured to charge an electricity source as a function of excess produced power and the electricity, the blended wing body, wherein the hybrid propulsion system is:

operatively connected to the first fuel store and the second fuel store;

configured to be powered by the first fuel and the second fuel; and such that the first fuel store is configured to be used by both the fuel offloading system for refueling the second aircraft in flight, and for powering the hybrid propulsion system; and powering, using an auxiliary power system operatively connected with the fuel cell, control surfaces.

17. The method of claim 16, further comprising, limiting heat transfer to the second fuel using an insulated outer wall of the second fuel store.

18. The method of claim 16, further comprising producing electricity using a fuel cell fueled by the second fuel.

19. The method of claim 16, wherein the method further comprises operating the flying boom using a boom control station.

20. The method of claim 16, wherein the vertical supports comprise pillars.

21. The method of claim 16, wherein the aircraft skin comprises a structural skin configured to bear at least a portion of the aerodynamic forces exerted on the aircraft skin.

22. The method of claim 16, wherein the blended wing body tanker comprises an offload radius of at least 3,0000 nautical miles.

23. The method of claim 16, wherein the blended wing body tanker comprises a fuel offloading capacity of at least 100,000 pounds.

24. The method of claim 16, wherein the blended wing body tanker comprises a maximum fuel takeoff length of 7,000 feet.

25. The method of claim 16, wherein the blended wing body tanker further comprises a transparent panel structured to allow for a direct view of the flying boom.

26. The method of claim 16, wherein the blended wing body tanker comprises a fuel to cargo ratio of at least 1.5.

27. The method of claim 16, wherein the first fuel store is located in a wing of the blended wing body.

28. The method of claim 27, wherein the second fuel store is located in a main body of the blended wing body.

29. The method of claim 16, wherein the blended wing body tanker comprises more than one fuel supply connections, wherein each fuel supply connection comprises a separate flying boom.

30. The method of claim 29, wherein a first flying boom of the more than one fuel supply connections is separated from a second flying boom of the more than one fuel supply connections by a distance of at least 65 feet.

* * * * *